United States Patent
Kim et al.

(10) Patent No.: US 10,496,151 B2
(45) Date of Patent: Dec. 3, 2019

(54) METHOD AND APPARATUS FOR CONTROLLING DISPLAY OF ELECTRONIC DEVICE

(71) Applicant: Samsung Electronics Co., Ltd., Suwon-si, Gyeonggi-do (KR)

(72) Inventors: Hyunghoon Kim, Suwon-si (KR); Soonwan Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 14/904,556

(22) PCT Filed: Jul. 22, 2014

(86) PCT No.: PCT/KR2014/006662
§ 371 (c)(1),
(2) Date: Jan. 12, 2016

(87) PCT Pub. No.: WO2015/012575
PCT Pub. Date: Jan. 29, 2015

(65) Prior Publication Data
US 2016/0147284 A1    May 26, 2016

(30) Foreign Application Priority Data

Jul. 22, 2013    (KR) .......................... 10-2013-0086130

(51) Int. Cl.
| G06F 1/32   | (2019.01) |
| G06F 1/3234 | (2019.01) |
| G06F 1/3206 | (2019.01) |
| G06F 1/3203 | (2019.01) |

(52) U.S. Cl.
CPC .......... *G06F 1/3265* (2013.01); *G06F 1/3206* (2013.01); *G06F 1/3203* (2013.01)

(58) Field of Classification Search
CPC ............................. G06F 1/3265; G06F 1/3206
USPC ......................................................... 713/320
See application file for complete search history.

(56) References Cited

U.S. PATENT DOCUMENTS

| 8,397,087 B1* | 3/2013 | Gardner .................. G06F 1/329 713/300 |
| 8,407,502 B1* | 3/2013 | Guy ....................... G06F 1/3218 713/320 |
| 2003/0156074 A1* | 8/2003 | Ranganathan ........ G06F 1/3203 345/1.1 |
| 2005/0055590 A1 | 3/2005 | Farkas et al. |

(Continued)

FOREIGN PATENT DOCUMENTS

| CN | 101903845 A | 12/2010 |
| CN | 102263854 A | 11/2011 |

(Continued)

*Primary Examiner* — Volvick Derose
(74) *Attorney, Agent, or Firm* — Jefferson IP Law, LLP

(57) ABSTRACT

The present invention relates to a method and an apparatus for controlling a display of an electronic device. The method for controlling the display of the electronic device according to the present invention may comprise the steps of: identifying a power state of the electronic device and a power-rating of at least one application; determining an application power state of the at least one application on the basis of a result of the identification; and controlling a display of the electronic device according to the determined application power state.

20 Claims, 14 Drawing Sheets

(56) References Cited

U.S. PATENT DOCUMENTS

| | | | |
|---|---|---|---|
| 2005/0066209 A1* | 3/2005 | Kee | G06F 1/1616 713/323 |
| 2006/0114267 A1 | 6/2006 | Park | |
| 2007/0143452 A1* | 6/2007 | Suenbuel | G06F 8/30 709/220 |
| 2007/0220293 A1* | 9/2007 | Takase | G06F 1/3203 713/320 |
| 2009/0094472 A1* | 4/2009 | Lin | G06F 1/3215 713/324 |
| 2009/0164152 A1 | 6/2009 | Creus et al. | |
| 2010/0122102 A1* | 5/2010 | Park | H04N 5/44504 713/340 |
| 2010/0145643 A1* | 6/2010 | Katpelly | G06F 1/3203 702/63 |
| 2010/0214278 A1* | 8/2010 | Miura | G06F 1/3203 345/212 |
| 2010/0274507 A1* | 10/2010 | Black | H04W 36/385 702/63 |
| 2010/0313050 A1* | 12/2010 | Harrat | G06F 1/3203 713/323 |
| 2011/0040990 A1* | 2/2011 | Chan | G06F 1/28 713/300 |
| 2011/0040996 A1* | 2/2011 | Hackborn | G06F 11/3409 713/340 |
| 2011/0296418 A1 | 12/2011 | Kim et al. | |
| 2012/0134517 A1* | 5/2012 | Sato | H04M 1/72522 381/150 |
| 2012/0178496 A1* | 7/2012 | Hwang | H04W 52/0264 455/550.1 |
| 2012/0216063 A1* | 8/2012 | Ogata | G06F 1/3284 713/323 |
| 2012/0230236 A1* | 9/2012 | Kert | H04M 1/2535 370/311 |
| 2012/0297215 A1* | 11/2012 | Saba | G06F 1/3203 713/320 |
| 2013/0007255 A1* | 1/2013 | Gerber | G06F 11/302 709/224 |
| 2013/0031353 A1* | 1/2013 | Noro | G06F 1/3212 713/100 |
| 2013/0046967 A1* | 2/2013 | Fullerton | H03K 3/0315 713/100 |
| 2013/0054998 A1* | 2/2013 | Wyatt | G06F 1/3265 713/323 |
| 2013/0339759 A1* | 12/2013 | Doddavula | G06F 1/3206 713/300 |
| 2014/0067295 A1* | 3/2014 | Putman | G06Q 50/06 702/61 |
| 2014/0180466 A1* | 6/2014 | Kato | G05B 19/042 700/174 |
| 2014/0229754 A1* | 8/2014 | Overby | G06F 11/3062 713/340 |
| 2014/0244190 A1* | 8/2014 | Berman | G01R 21/00 702/61 |
| 2014/0285531 A1* | 9/2014 | Dasher | G09G 5/10 345/690 |
| 2014/0325481 A1* | 10/2014 | Pillai | G06F 11/3409 717/124 |
| 2015/0089262 A1* | 3/2015 | Cairns | G06F 1/3203 713/323 |

FOREIGN PATENT DOCUMENTS

| | | |
|---|---|---|
| CN | 102498739 A | 6/2012 |
| CN | 102918473 A | 2/2013 |
| EP | 1 503 363 A2 | 2/2005 |
| EP | 2475204 A2 | 7/2012 |
| JP | H05233551 A | 9/1993 |
| KR | 10-2010-0092977 A | 8/2010 |
| KR | 10-2012-0085724 A | 8/2012 |

* cited by examiner

FIG. 5

| Power state of electronic device | Standalone | + Web | + Audio | + Bluetooth |
|---|---|---|---|---|
| 71%~100% | 1 | 1 | 1 | 1 |
| 41~70% | 2 | 2 | 2 | 2 |
| 21~40% | 3 | 3 | 3 | 3 |
| ~20 | 5 | 5 | 5 | 5 |

FIG. 7

| Power state of electronic device | standalone turned-on state | + Web | + Audio | + Bluetooth |
|---|---|---|---|---|
| 71%~100% | 1 | 1 | 1 | 1 |
| 41~70% | 2 | 2 | 2 | 2 |
| 21~40% | 3 | 3 | 3 | 3 |
| ~20 | 5 | 5 | 5 | 5 |

[a]

| Power state of electronic device | standalone turned-on state | + Web | + Audio | + Bluetooth |
|---|---|---|---|---|
| 71%~100% | 1 | 1 | 1 | 2 |
| 41~70% | 1 | 5 | 2 | 4 |
| 21~40% | 2 | 5 | 3 | 5 |
| ~20 | 3 | 5 | 5 | 5 |

[b]

METHOD AND APPARATUS FOR CONTROLLING DISPLAY OF ELECTRONIC DEVICE

TECHNICAL FIELD

The present invention relates to electronic devices, and more particularly, to a method and an apparatus of controlling the displaying of an electronic device.

BACKGROUND ART

In recent years, electronic devices such as mobile devices have been developed to multimedia devices that can provide a variety of additional services such as an electronic organizer function, a game function, a schedule management function, etc. As electronic devices have provided a variety of additional services, user interfaces that allow users to conveniently manage and use additional services are regarded with importance.

Many applications that electronic devices with a communication function may download and execute have recently been released. That is, recent electronic devices may run a variety of applications and various functions. As electronic device have simultaneously executed a plurality of applications and functions by a multitasking function, researches have also been made to efficiently manage power for the electronic devices.

According to such technology trends, studies for interfaces are required to efficiently manage power for electronic devices and to display it for the users.

SUMMARY OF THE INVENTION

The present invention has been made in view of the above problems, and provides a method and apparatus of controlling the displaying of an electronic device according to a power state of the electronic device and a power-rating of an application.

In accordance with an exemplary embodiment of the present invention, the present invention provides a display control method of an electronic device including: detecting a power state of the electronic device and a power-rating of at least one application; determining an application power state for at least one application, based on the detection result; and controlling the displaying of the electronic device based on the determined application power state.

In accordance with another exemplary embodiment of the present invention, the present invention provides an electronic device including: a display; and a controller for: detecting a power state of the electronic device and a power-rating of at least one application; determining an application power state for at least one application based on the detection result; and controlling the displaying of the display according to the determined application power state.

BRIEF DESCRIPTION OF DRAWINGS

The features and advantages of the invention will become more apparent from the following detailed description in conjunction with the accompanying drawings, in which:

FIG. 5 is an example of multiple relation power-rating information according to an embodiment of the present invention;

FIG. 7 is diagrams to correct a multiple relation power-rating;

MODE FOR THE INVENTION

Hereinafter, exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

Figure 1:
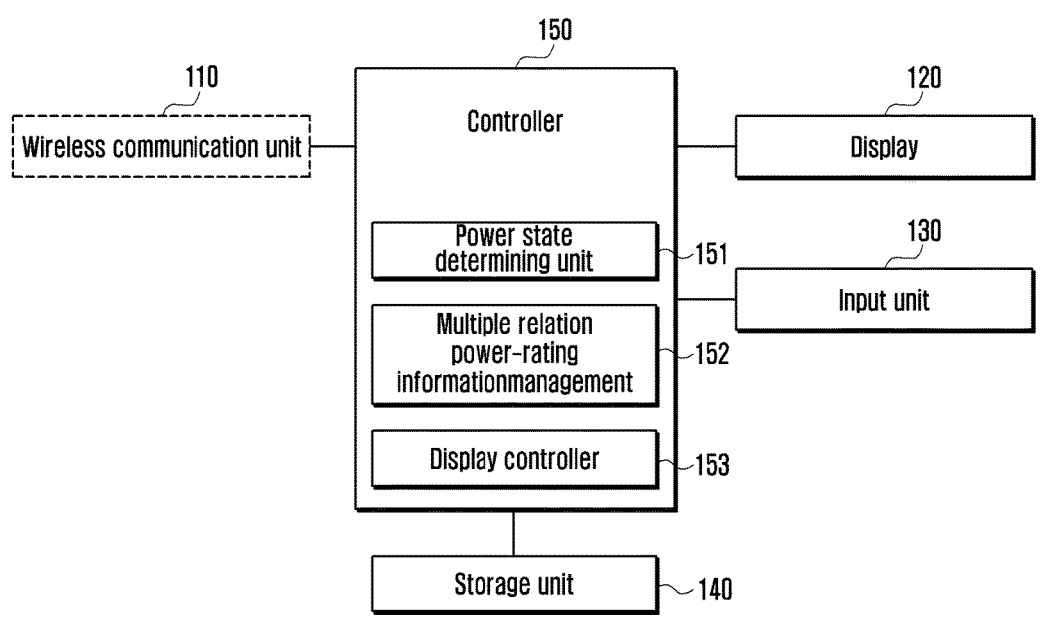
FIG. 1 is a schematic block diagram illustrating an internal configuration of an embodiment according to an embodiment of the present invention.

FIG. 1 is a schematic block diagram illustrating an internal configuration of an embodiment according to an embodiment of the present invention. As shown in FIG. 1, the electronic device may include a wireless communication unit 110, a display 120, an input unit 130, a storage unit 140, and a controller 150.

The wireless communication unit 110 performs transmission/reception of corresponding data for wireless communication of the electronic device. The wireless communication unit 110 may include an RF transmitter for up-converting the frequency of signals to be transmitted and amplifying power of the signals and an RF receiver for low-noise amplifying received signals and down-converting the frequency of the received signals. In addition, the wireless communication unit 110 may receive data in a wireless channel and transfer it to the controller 150. The wireless communication unit 110 may transfer data from the controller 150 through the wireless channel.

The wireless communication unit 110 is illustrated with a dashed block as shown in FIG. 1, and this is because the electronic device may be implemented without the wireless communication unit 110. For example, when the electronic device may be a device with a telephony function or Internet access function, such as a smartphone, etc., it may include the wireless communication unit 110. However, when the electronic device may be an electronic device, such as an electronic dictionary, MP3 player, etc., it may not need to include the wireless communication unit 110.

The display 120 may be implemented with a Liquid Crystal Display (LCD), an Organic Light Emitting Diode (OLED), an Active Matrix Organic Light Emitting Diodes (AMOLED), or the like. The display 120 visually provides menus of the electronic device, received data, function setting information and other information to the user. The display 120 outputs a booting screen of the electronic device, a standby screen, a menu screen, a call screen, screens for applications, etc.

The input unit 130 receives a user's key operations for controlling the electronic device, creates the input signals, and transfers them to the controller 150. The input unit 130 may include a key pad with number keys and direction keys. The input unit 130 may be implemented as a function key on one side of the electronic device.

According to an embodiment, the display 120 and the input unit 130 may be implemented with a touch screen. In that case, the touch screen may further include a touch sensor unit for detecting a user's input touches.

The touch sensor unit may be implemented with a pressure sensor or a touch sensor such as a resistive overlay type, a capacitive overlay type, an infrared beam, etc. Touch sensor unit may also be implemented with various types of sensors that can detect a contact to an object or pressure of an object. The touch sensor unit detects a user's input touch, creates the detected signal, and transfers it to the controller 150. The detected signal includes coordinates of a user's input touch. When the user makes a touch and moves the input touch, the touch sensor unit creates a detected signal including the coordinates of a path of the moving touch and transfers it to the controller 150.

The storage unit 140 stores programs and data required to operate the electronic device. The storage unit 140 includes a program storage area and a data storage area. The program storage area stores an operating system (OS) for controlling the entire operation of the electronic device and booting the electronic device, application programs required to play back multimedia content, etc., applications programs required for option functions for the electronic device, such as, a camera function, an audio playback function, an image or video playback function, etc. The data storage area stores data created according to the use of the electronic device, such as images, videos, a phonebook, audio data, etc.

The controller 150 controls the entire operation of the respective components in the mobile device. In particular, the controller 150 according to an embodiment of the present invention may control the displaying of the electronic device according to a power state of the electronic device and power-ratings of applications. To this end, the controller 150 may include a power state determining unit 151, a multiple relation power-rating information management 152 and a display controller 153.

The power state determining unit 151 may detect a power state of the electronic device and a power-rating of at least one application and may determine application power states based on the detection result. When a plurality of applications are installed to the electronic device, the power state determining unit 151 may determine power states of the respective applications. According to an embodiment of the present invention, the application power state may vary depending on a power state of the electronic device and a power-rating of at least one application.

The multiple relation power-rating information management 152 manages multiple relation power-rating information about the respective applications, according to an embodiment of the present invention. The multiple relation power-rating may refer to a power-rating of application, considering a power state of the electronic device and a state as to whether other application is executed. The multiple relation power-ratings may be set according to the respective applications. The multiple relation power-ratings may also be set considering a power state according to an operating state of the electronic device when an application is executed and also a power state when other applications are executed simultaneously, with the execution of the application.

According to an embodiment of the present invention, when an application is installed to the electronic device, the multiple relation power-rating information management 152 may set a multiple relation power-rating for the installed application. The process of setting a multiple relation power-rating will be described in detail later referring to FIG. 4. The multiple relation power-rating information management 152 may update the multiple relation power-ratings when satisfying a preset period or a preset condition.

The display controller 153 controls the displaying of the display 120 of the electronic device according to the determined application power state. According to an embodiment of the present invention, the display controller 153 may control the level of brightness of the display 120 of the electronic device according to the determined application power state. For example, the display controller 153 may control the display 120 to lower the level of brightness to be darker as the power state of the application is to be insufficient. According to another embodiment of the present invention, the display controller 153 may control the displaying of an icon corresponding to an application according to the determined application power state. In that case, the display controller 153 may control the displaying of an icon in at least one of the following: color, transparency, and border. For example, the display controller 153 may control the level of brightness of an icon corresponding to an application to be lowered or darker, as the power state of the application is to be insufficient.

Although the embodiment is implemented in such a way that the controller 150 includes separated blocks that perform different functions, it should be understood that the present invention is not limited to the embodiment. For example, the embodiment may be modified in such a way that the controller 150 performs the functions of the power state determining unit 151.

Figure 2:
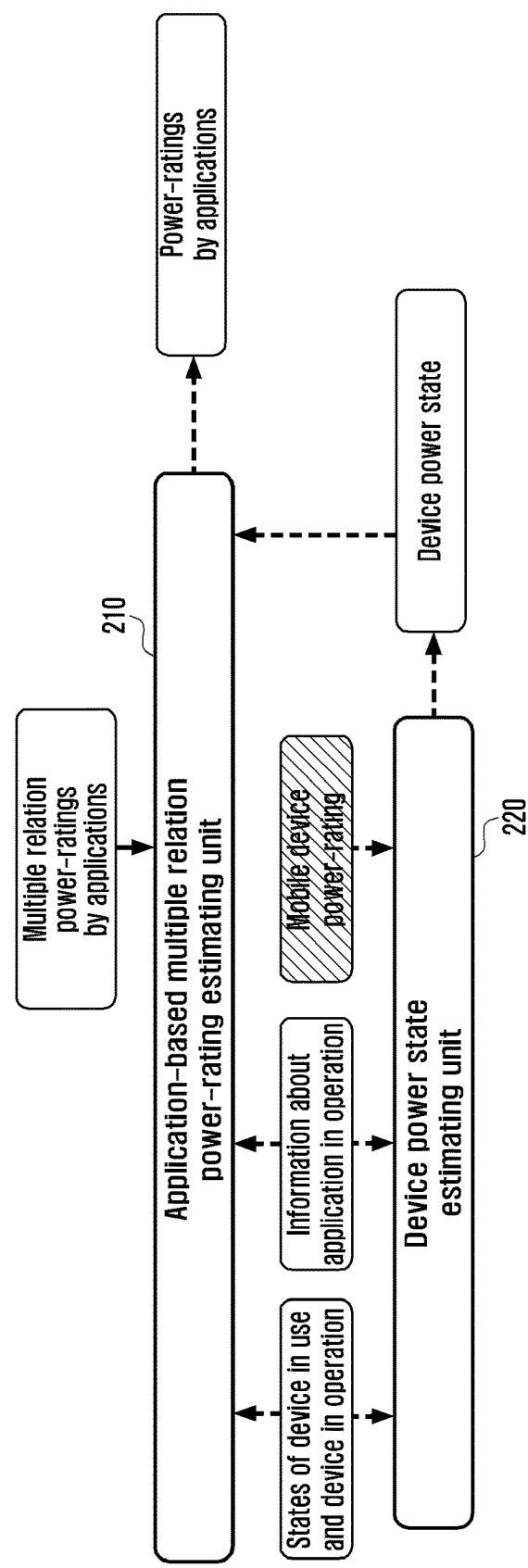
FIG. 2 is a diagram illustrating a process of determining an application power state according to an embodiment of the present invention.

FIG. 2 is a diagram illustrating a process of determining an application power state according to an embodiment of the present invention. More specifically, FIG. 2 may be a detailed block of the power state determining unit 151 shown in FIG. 1.

The application-based multiple relation power-rating estimating unit 210 obtains information about multiple relation power-ratings by applications. The multiple relation power-rating estimating unit 210 may obtain information about an operating state of the electronic device, information about modules in operation (e.g., GPS module, G sensor module, etc.), and information about an application in execution.

The multiple relation power-rating estimating unit 210 may obtain information about a power state of the electronic device from a device power state estimating unit 220. In that case, the device power state estimating unit 220 may determine a power state of the electronic device, based on information about an operating state of the electronic device, information about modules in operation (e.g., GPS module, G sensor module, etc.), and information about an application in execution, and information a power-rating—the electronic device.

The multiple relation power-rating estimating unit 210 may determine a power state of an application based on the obtained information.

A detailed description about the application power state will be provided later.

Figure 3:
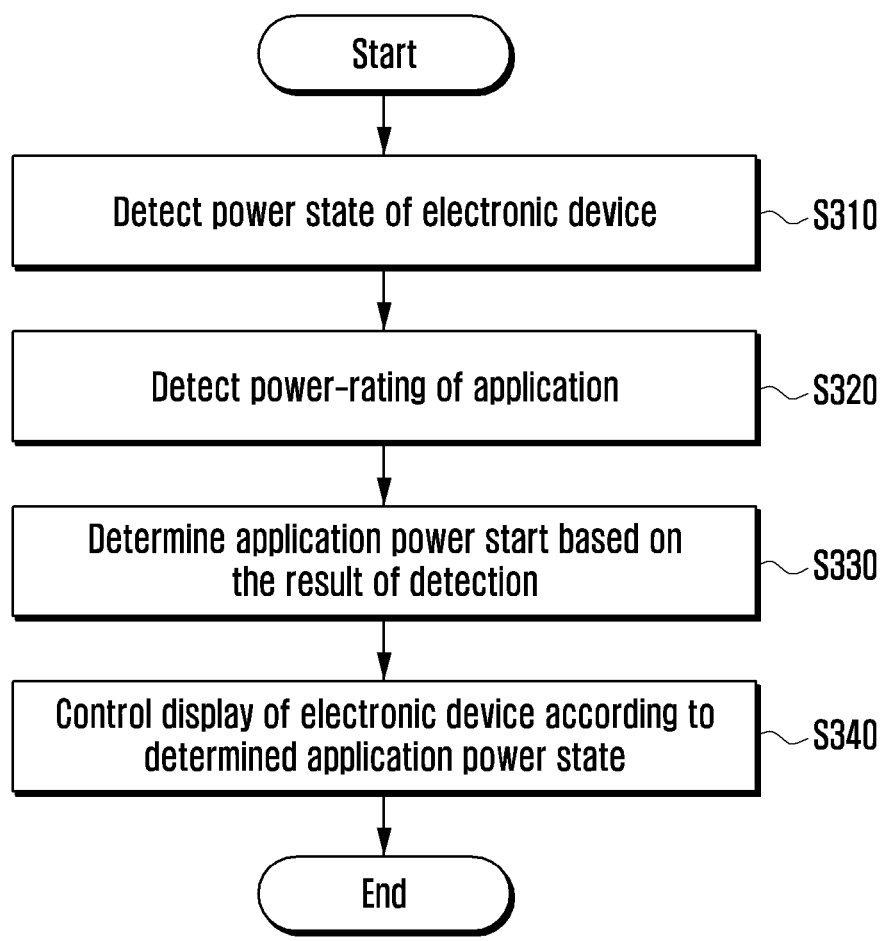
FIG. 3 is a flow chart that describes a process of controlling the displaying of an electronic device according to an embodiment of the present invention.

FIG. 3 is a flow chart that describes a process of controlling the displaying of an electronic device according to an embodiment of the present invention.

The electronic device detects its power state (S310). According to an embodiment of the present invention, in order to detect the power state of the electronic device, the electronic device may check at least one of the following: its power-rating, its modules, modules that are currently running (e.g., a GPS module), and information about applications that are currently executed.

After that, the electronic device detects a power-rating of application (S320). The power-rating of application may be divided into a number of levels. The power-rating of application may be divided, based on at least one of the following standards: an operation percentage of a processor, a memory occupation rate, and modules cooperating therewith, when a corresponding application is running.

The electronic device determines a power state of application, based on the detected power state of electronic device and the detected power-rating of application. The power state of application may be standard information that the electronic device uses to control the display of the electronic device or the displaying of an icons corresponding to an application displayed on the display. The power state of application may include a power-rating of a corresponding application, an operable time period of the electronic device when performing operations, etc.

According to an embodiment, the power state of application may vary according to a power state of the electronic device and a power-rating of a application. The feature that the power state of application varies will be described later.

The electronic device may control the displaying of the electronic device according to the determined application power state (S340). To this end, the embodiment of the present invention may control the screen brightness of the display of the electronic device. For example, when the power state of application is less than a preset value, the brightness of the display of the electronic device is set to be less than or equal to a preset level. In addition, according to another embodiment of the present invention, the electronic device may control the displaying of an icon corresponding to an application displayed on the display. For example, the electronic device may change in brightness or transparency of a corresponding icon or in color of the border of the icon, according to the power state of the application. It should be understood that the present invention is not limited to the embodiment described above.

According to an embodiment of the present invention, the electronic device may restrict the functions according to power states of applications. For example, when a power state of application may be divided into State 1 (enough), State 2 (poor) and State 3 (limit), the functions of an electronic device may be restricted, according to power states of the respective applications, as shown in the following table 1.

TABLE 1

| Power states of application | Function restriction |
|---|---|
| State 1 (enough) | No restriction Functions of mobile device are not restricted. |
| State 2 (poor) | 1. When Poor and Limit Processes more than a preset number are performed for a Back-ground task of a current mobile device, a restriction may be imposed on functions or existing Process Killing may be performed<br>2. When processes are performed, the maximum of the level of brightness of LCD Back-light is restricted (approximately to the middle level)<br>3. When App is running, Display FPS is restricted (approximately 50 FPS with respect to the maximum 60 FPS (option)) |
| State 3 (limit) | 1. In order to perform processes, a warning message is transferred through a pop-up window.<br>2. Processes are performed only when user allows for the performance of the process<br>3. When Poor and Limit Processes more than a certain number are performed, existing Process Killing may be read.<br>4. When processes are performed, the maximum of the level of brightness of LCD Back-light is restricted (approximately to the higher level)<br>5. When App is running, Display FPS is restricted (approximately 30 FPS) |

It should be understood that the present invention is not limited to the table 1.

Meanwhile, the application power state shown in operation S330 of FIG. 3 is described in detail as follows.

The embodiment of the present invention may determine a power state of application, based on information about a power state of electronic device, an operating state of hardware module, an operating state of application, etc. In order to determine the application power state, an embodiment of the present invention may employ a multiple relation power-rating.

The multiple relation power-rating may refer, when an application is executed, to a power-rating of application, considering a power state of electronic device and a state as to whether other application is executed. The multiple relation power-ratings may be set according to the respective applications. The multiple relation power-ratings may also be set considering a power state according to an operating state of the electronic device when an application is executed and also a power state when other applications are executed simultaneously, with the execution of the application.

A detailed description about a multiple relation power-rating is provided as follows. For example, when an application is executed, the power-rating of the application may vary according to a power state of a mobile device (e.g., the remaining battery capacity). In addition, the power-rating of the application may vary according to whether the application is executed only or with other applications. In addition, although a plurality of applications are simultaneously executed, when at least two applications share the same module (e.g., a case where a navigation application and the Facebook application share a GPS module), the power-ratings of the applications may be lower than when summing the power-ratings of the applications when the applications are executed respectively.

In the following description, the multiple relation power-rating is described in detail referring to the accompanying drawings.

Figure 4:
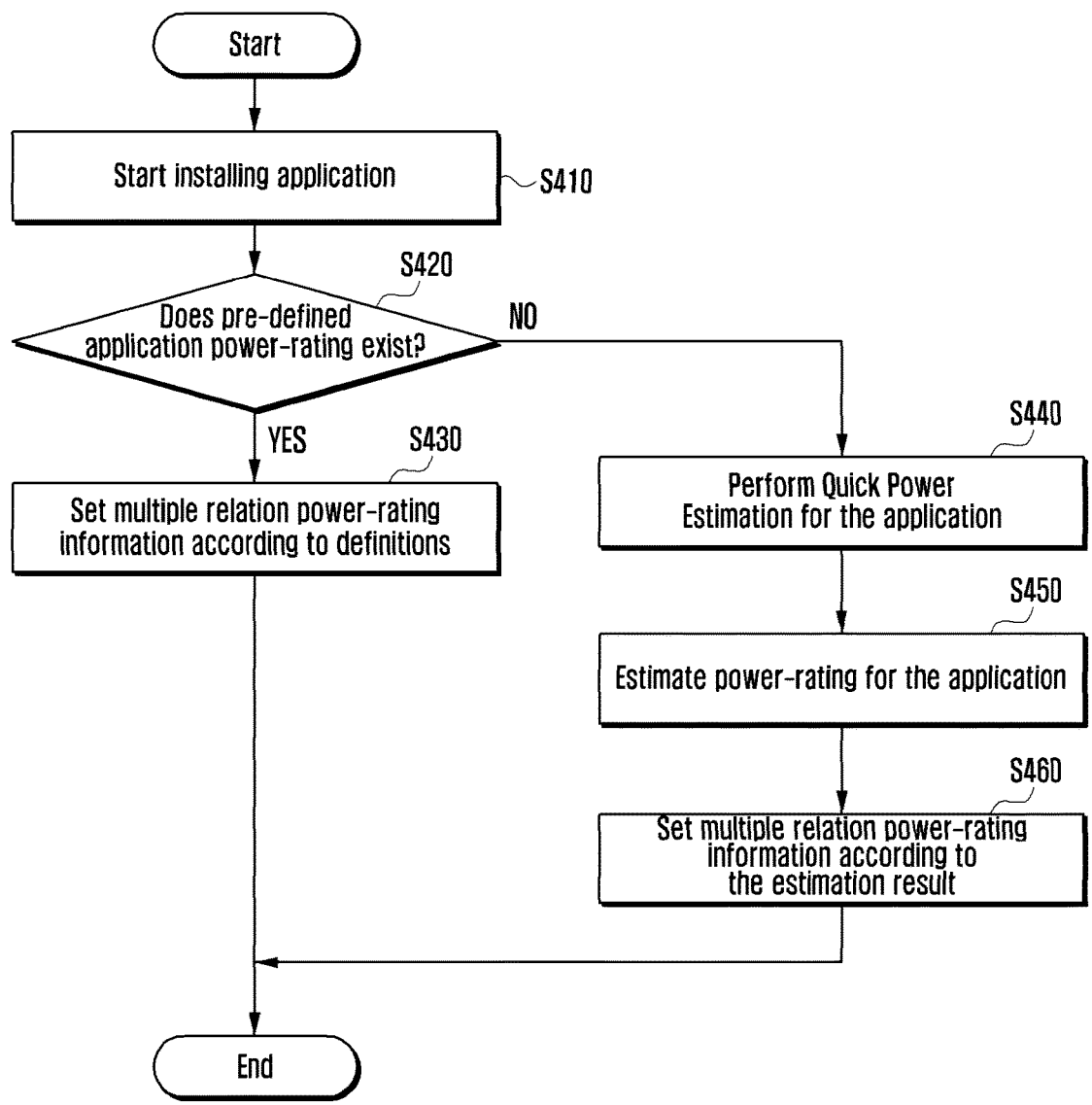
FIG. 4 is a flow chart that describes a process of setting a multiple relation power-rating when an application is first installed.

FIG. 4 is a flow chart that describes a process of setting a multiple relation power-rating when an application is first installed.

The electronic device starts installing an application (S410). The application may be an application downloaded from a specific server or a default application stored in the electronic device.

The electronic device determines whether it includes a pre-defined application power-rating for the installed application (S420).

When the electronic device ascertains that it has included a pre-defined application power-rating for the installed application in operation S420, it sets multiple relation power-rating information about the application according to the preset definition (S430).

An example of the set multiple relation power-rating information is shown in FIG. 5.

Referring to FIG. 5, the multiple relation power-rating of application may be defined, with respect to a power state 510 of electronic device, as a power-rating 520 when a corresponding application is executed alone and a power-rating 530 when a corresponding application is executed simultaneously along with other applications (e.g., a web browser, an audio application, a short-range communication application, etc.).

Referring back to FIG. 4, when the electronic device ascertains that it has not included a pre-defined application power-rating for the installed application in operation S420, it may perform a Quick Power Estimation for the corresponding application (S440). This may be a process of estimating power, assuming that the controller (processor) of the electronic device directly executes or has executed the application.

The electronic device estimates a power-rating of the application (S450). The electronic device sets the multiple relation power-rating information about the application according to the estimation result (S460).

The multiple relation power-rating information set through operations S440 to S460 may also be implemented as shown in FIG. 5.

Meanwhile, according to an embodiment of the present invention, an additional correction process (update) may be performed in order to increase the reliability of the multiple relation power-rating set when an application is downloaded. The additional correction process for the multiple relation power-rating may be performed at a preset period or when a specific condition is satisfied. For example, when an electronic device is performing a battery recharging operation or when the remaining battery capacity is greater than or equal to a preset level and the electronic device is in an idle mode, the additional correction process may be performed.

A detailed description about the process of correcting a multiple relation power-rating is provided as follows referring to FIGS. 6 and 7.

Figure 6:
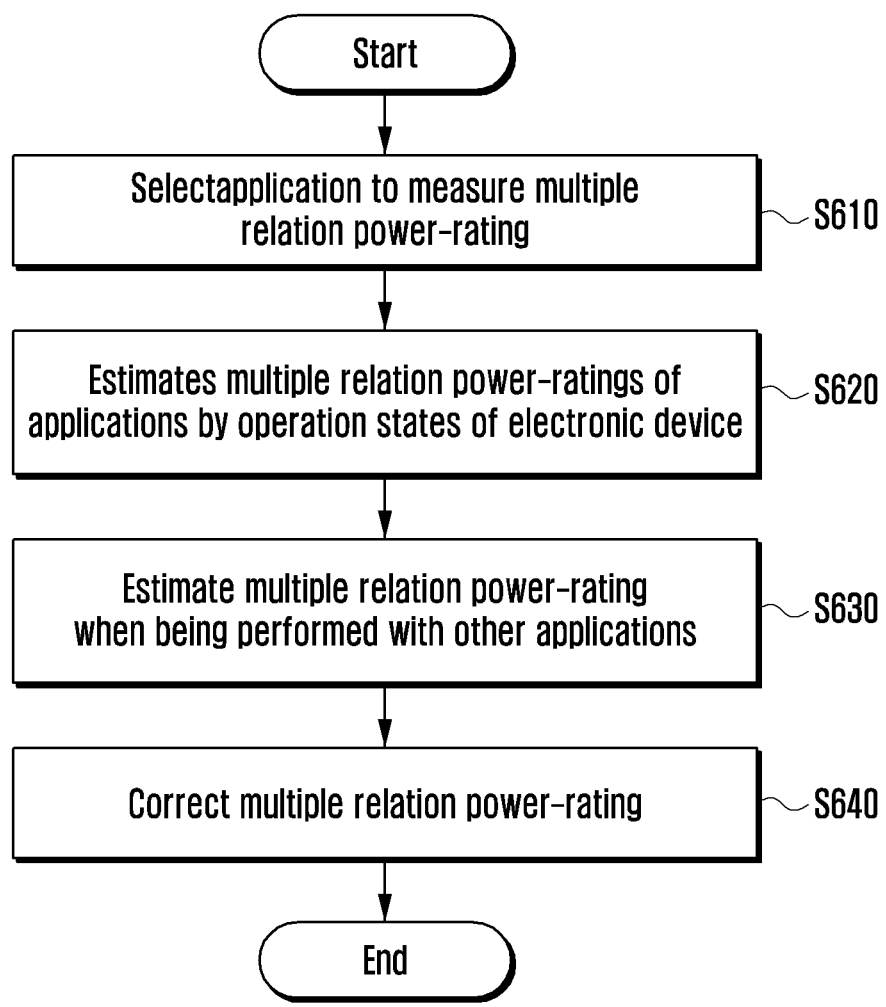
FIG. 6 is a flow chart that describes a process of correcting a multiple relation power-rating according to an embodiment of the present invention.

FIG. 6 is a flow chart that describes a process of correcting a multiple relation power-rating according to an embodiment of the present invention.

The electronic device selects an application for measuring or correcting a multiple relation power-rating (S610).

The electronic device estimates multiple relation power-ratings of application by operating states of electronic device (S620). According to an embodiment of the present invention, types of devices (modules) by applications for estimating a multiple relation power-rating may be selected based on histories of applications.

As shown in FIG. 7A, in a state a power state of electronic device for an application is 21~40%, the power state of the application is 3 when the application is executed alone. However, after the power state of the application is estimated, it may be estimated as 2 as shown in FIG. 7B.

Referring back to FIG. 6, the electronic device estimates a multiple relation power-rating when the corresponding application is executed along with other applications (S630). According to an embodiment of the present invention, types of applications related to applications for estimating a multiple relation power-rating may be selected based on histories of applications.

As shown in FIG. 7A, in a state where a power state of electronic device for an application is 21~40%, the power state of the application is 3 when the application is executed simultaneously along with a web browser. However, after the power state of the application is estimated, it may be estimated as 5 as shown in FIG. 7B.

Referring back to FIG. 6, the electronic device corrects the multiple relation power-rating information about the application (S640).

Figure 8:
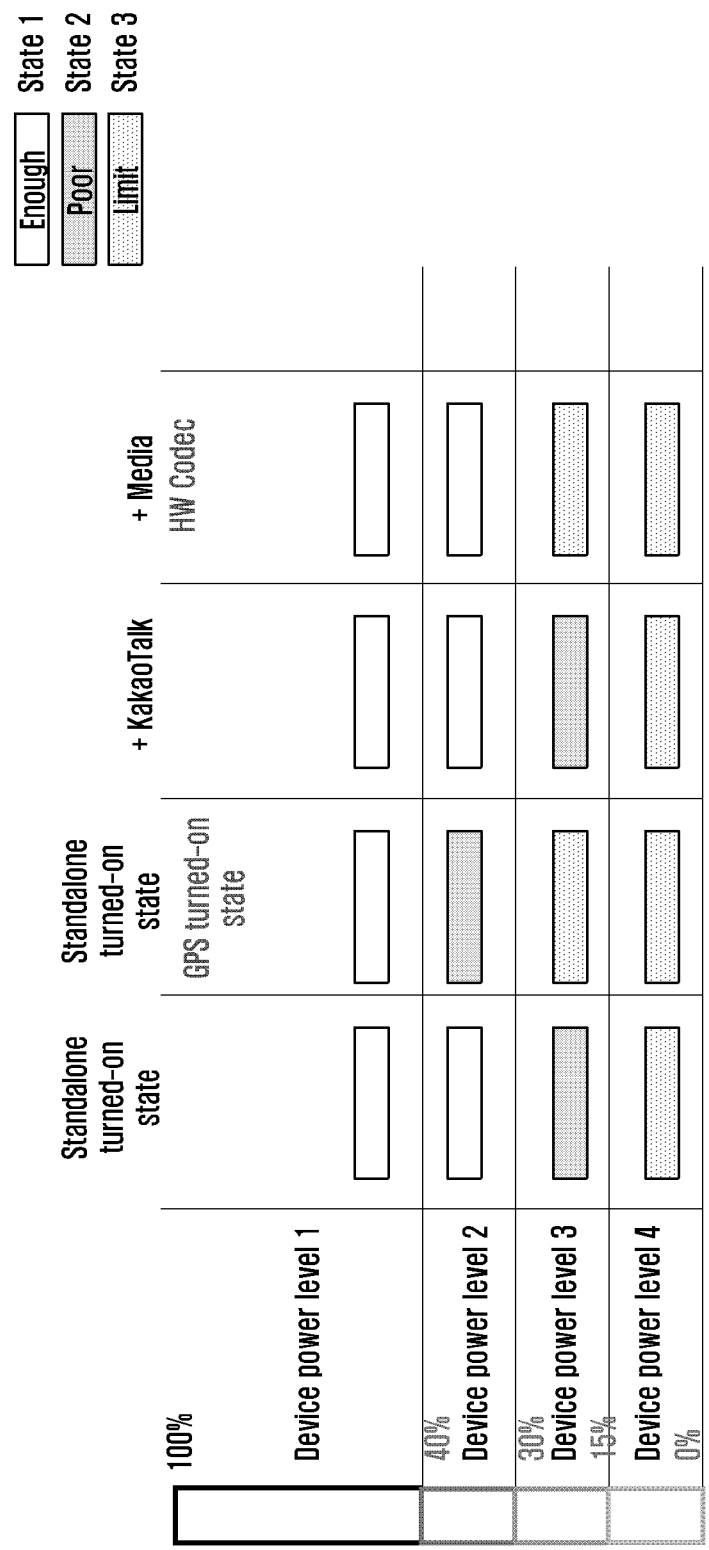
FIG. 8 is an example illustrating multiple relation power-ratings for an application, according to an embodiment of the present invention.

FIG. 8 is an example illustrating multiple relation power-ratings for an application, according to an embodiment of the present invention.

When an application is a web browser, e.g., Naver, the multiple relation power-rating for the Naver is shown in FIG. 8. The multiple relation power-rating shown in FIG. 8 shows power states of applications according to a state whether the application is executed simultaneously along with other applications, considering the power state of the electronic device.

The following description is about a specific case of FIG. 8. In a state where power of the electronic device is level 3, when the application, Naver, is executed alone, or simultaneously along with a messenger, e.g., KakaoTalk, the power state of the Naver application is State 2.

In a state where the application, Naver, is executed alone, if a media application is additionally executed, hardware (e.g., codec) for the media application is additionally enabled in the electronic device. Therefore, a prediction may be made in such a way that the power state of the application, Naver, is lowered in level from State 2 to State 3.

The embodiment of the present invention may predict a power state after the process, based on the multiple relation power-rating and a power state of application included in the multiple relation power-rating, and may perform a process of displaying screens of the electronic device, a process of displaying icons, a process of restricting functions, etc., using the prediction result. The embodiment is described in detail as follows referring to the accompanying drawings.

Figure 9:
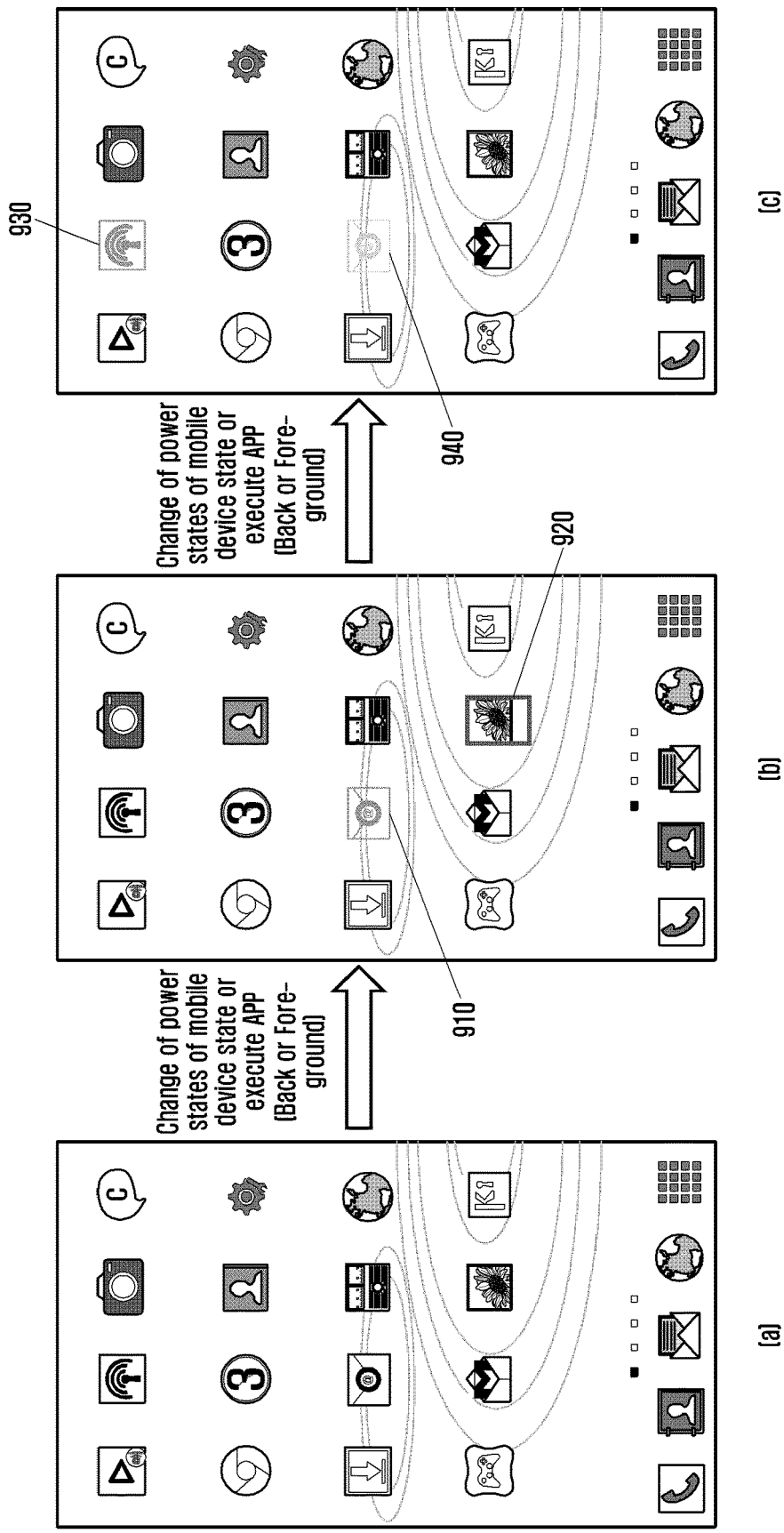
FIG. 9 shows screens of an electronic device according to a method of displaying power states of applications, so that the user can recognize the power states, according to an embodiment of the present invention.

FIG. 9 shows screens of an electronic device according to a method of displaying power states of applications, so that the user can recognize the power states, according to an embodiment of the present invention.

FIG. 9A is a general home screen of an electronic device. The electronic device may display an icon (icons) corresponding to at least one application on the display. As shown in FIG. 9A, the icons may be arranged on the screen in grid, but not limited thereto. The icons may be arranged regularly or irregularly on the screen.

In the following description, it is assumed that the power state of the electronic device varies or an application has been executed.

As shown in FIG. 9B, the electronic device detects its power state and a power-rating of application and determines an application power state of at least one application. The electronic device controls its displaying according to the determined application power state.

More specifically, as shown in FIG. 9B, the electronic device may set an icon 910 of an application corresponding to a relatively low power-rating (a rating corresponding to high power consumption) and an icon 920 of an application corresponding to a relatively high power-rating (a rating corresponding to low power consumption) to be displayed differently in transparency, brightness, shape, etc. For example, the icon 910 of an application corresponding to a relatively low power-rating may be set to be displayed at a high level of transparency. Similarly, the icon 920 of an application corresponding to a relatively high power-rating may be set to be displayed at a low level of transparency.

After that, the power state of the electronic device may vary; the application that has been working may be stopped; or other applications may be executed. That is, at least one of the following: a power state of the electronic device and a state where an application is executed may be altered. The electronic device detects its altered power state and a power-rating of application and determines an application power state of at least one application. The electronic device controls its displaying according to the determined application power state.

More specifically, as shown in FIG. 9C, the electronic device may alter the transparency of an icon 930 of an application, the power-rating of which has been lowered according to the altered condition, and may display the icon with the altered transparency. Similarly, the electronic device may perform a control operation to set the transparency of an icon 940 of an application, the power-rating of which has been lowered to a lower power-rating according to the altered condition, to a higher level, and to display the icon with the altered transparency.

Figure 10:
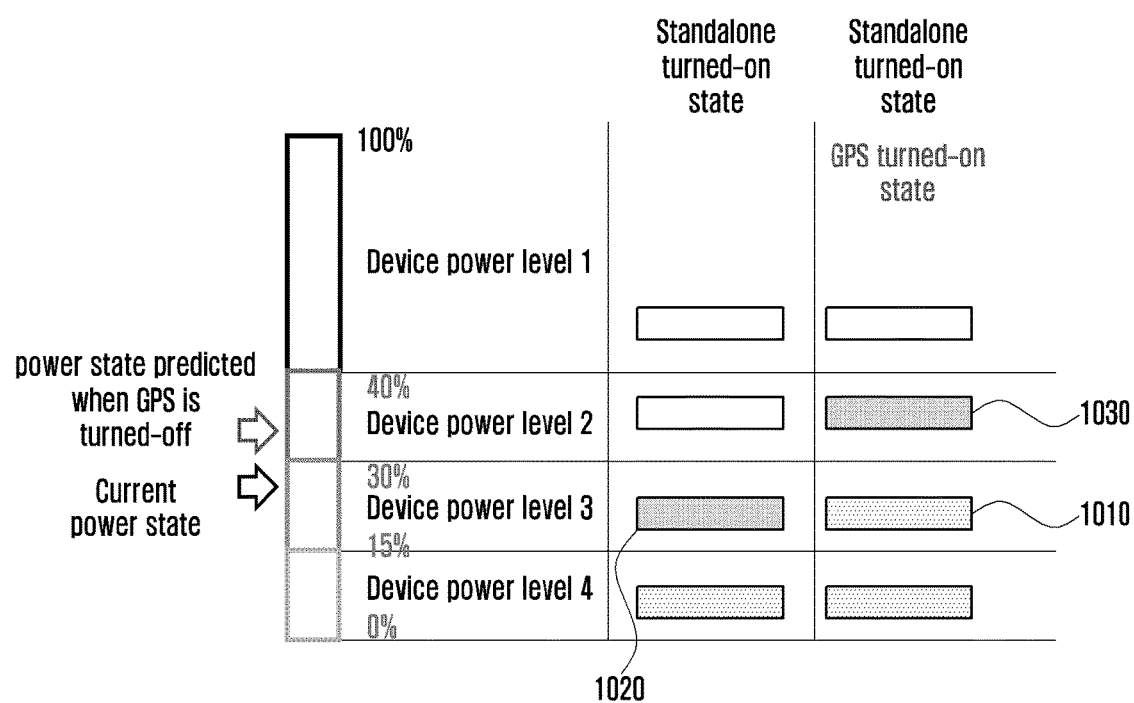
FIG. 10 is a diagram illustrating a method of predicting the change of application power states using a multiple relation power-rating for an application.
Figure 11:
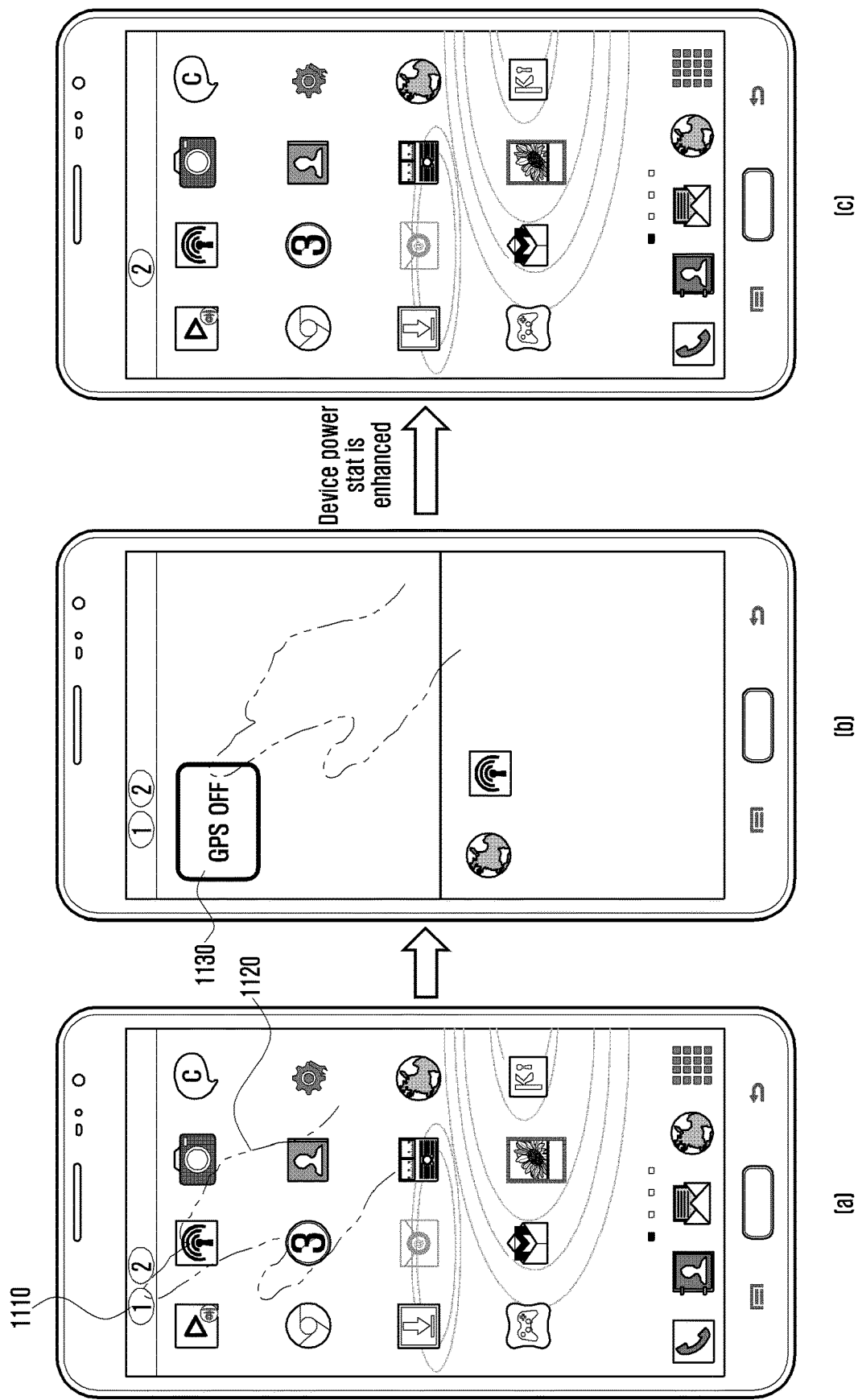
FIG. 11 shows interfaces for informing user of the change of power states of an electronic device that is predicted according to the method shown in FIG. 10.

FIGS. 10 and 11 illustrate a diagram that describes a method of predicting the change of application power states and a user interface using the prediction result.

FIG. 10 is a diagram illustrating a method of predicting the change of application power states using a multiple relation power-rating for an application.

For example, it is assumed that an electronic device is currently running in a state where its current power state is State 3 and the GPS module is in operation. Referring to the multiple relation power-rating shown in FIG. 10, it may be predicted that the power state of the electronic device varies according to whether the GPS module is turned on or off. For example, when the GPS module is turned off, it is predicted that a power state 1010 of the electronic device will be altered to a power state 1020. In addition, when the GPS module is turned off, it is predicted that a power state 1010 of the electronic device will be altered through a state 1020 to a power state 1030 where power is proper. This informs that, when the power level of the electronic device is determined not by the remaining battery capacity but by as a state as to whether other hardware modules and applications are executed simultaneously while the GPS module is executed, the power level of the electronic device may be increased when the GPS module is turned off.

As described above, when it is predicted that the power state or power level of an electronic device varies, the method according to an embodiment of the present invention may an interface for informing users of the prediction. This is described in detail referring to FIG. 11.

FIG. 11 shows interfaces for informing user of the change of power states of an electronic device that is predicted according to the method shown in FIG. 10.

In the foregoing description referring to FIG. 10, a case has been explained where the power state of a specific application varies according to whether the GPS module is turned on or off. The embodiment of the present invention of FIG. 11 provides a method to enhance an application power state by terminating a specific task or application in a state where the power state of a specific application varies as described in FIG. 10.

As shown in FIG. 11, in a state where a power state of an electronic device is less than or equal to a specific level, when the remaining battery capacity is insufficient, the electronic device may show a preset power warning icon 1110. The user may recognize that the power state of the electronic device is less than or equal to a specific level, through the power warning icon 1110.

In order to enhance the power state of the electronic device, it is assumed that a user input 1120 for terminating a task has been received. In that case, as shown in FIG. 11B, the electronic device may show a task or application for altering a power state of a specific application or a power state of the electronic device, when it is powered off or turned-off.

FIG. 11B shows an interface for turning off a GPS module. When a user's input is applied to the interface 1130, the GPS module is turned off.

In that case, as shown in FIG. 11C, a power state of the electronic device or a power state of a specific application may be enhanced.

Figure 12:
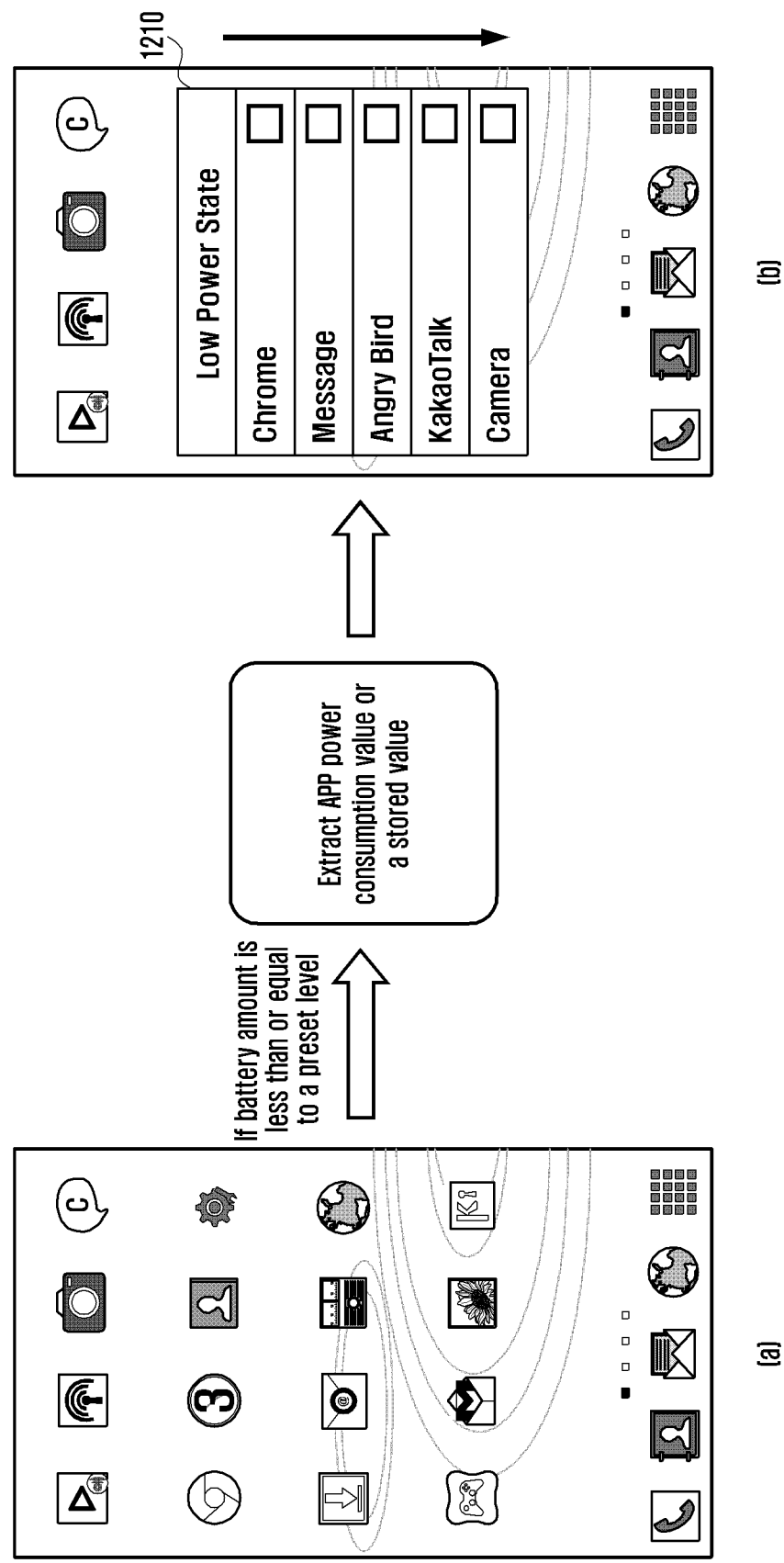

It should be understood that the present invention is not limited to the embodiment shown in FIG. 11 and may be altered to various modifications, one of which is illustrated in FIG. 12.

FIG. 12 shows interfaces for informing user of the change of power states of an electronic device that is predicted according to another embodiment of the present invention.

FIG. 12A shows a state where a plurality of applications are simultaneously executed and thus the power state of the electronic device is less than or equal to a specific level where power is insufficient. For example, the remaining battery capacity of the electronic device is less than or equal to a specific level.

In that case, the electronic device extracts power consumption values of respective applications. The electronic device may also detect power consumption values by applications that have been stored.

After that, the electronic device extracts a preset number of applications that have consumed a relatively large amount of power. The electronic device may show the extracted applications on a pop-up window 1210 as shown in FIG.

12B. In that case, the applications may be arranged in order of high power consumption on the pop-up window 1210.

Figure 13:
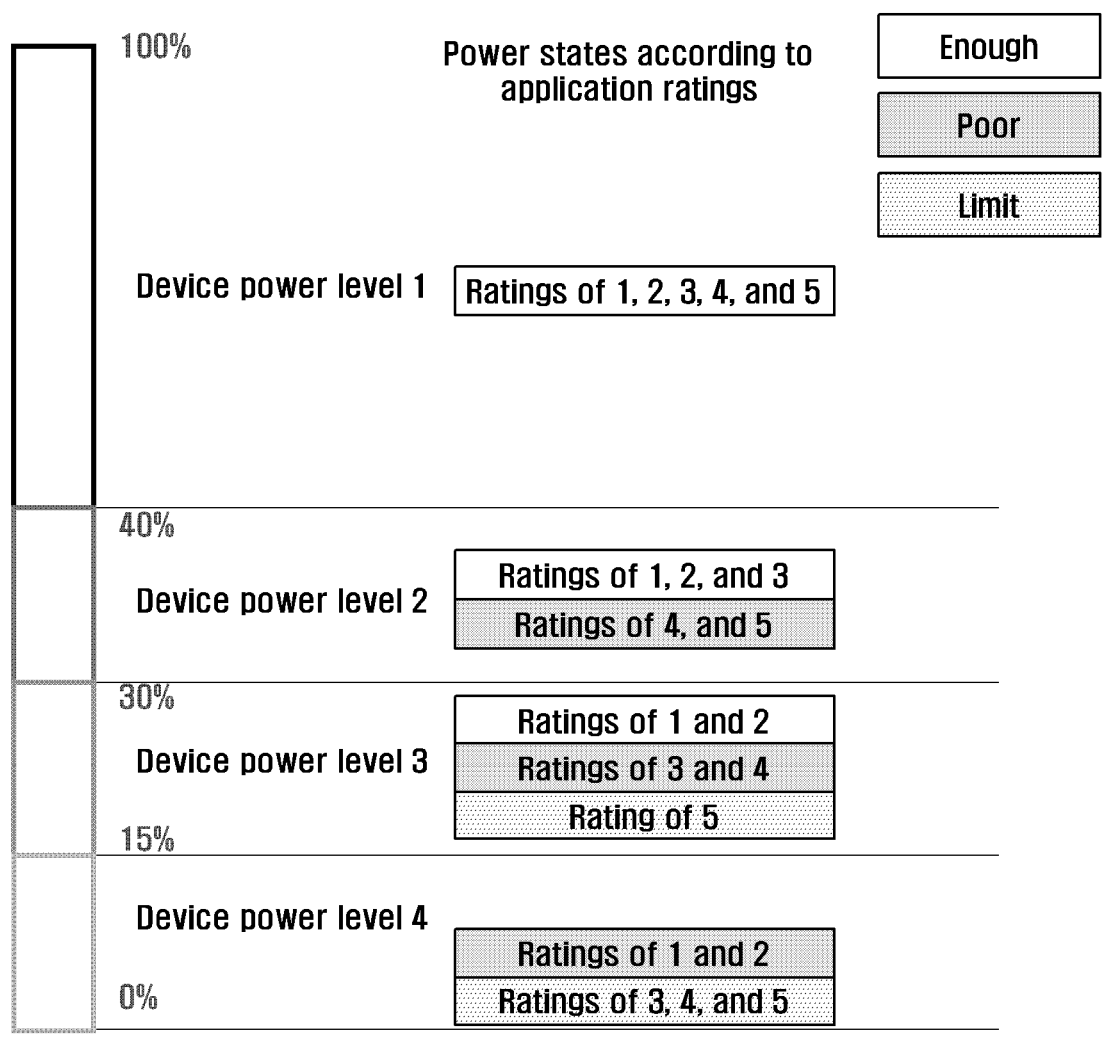
FIG. 13 is a diagram showing the change of power states of applications according to power levels of an electronic device according to an embodiment of the present invention.

FIG. 13 is a diagram showing the change of power states of applications according to power levels of an electronic device according to an embodiment of the present invention.

As shown in FIG. 13, a power state of electronic device is divided into level 1 to level 4. The power state of electronic device may be determined, based on a power-rating of electronic device, the remaining battery capacity, a state whether a hardware module runs, and the number of or types of applications in operation.

A power-rating of application may be divided into ratings of 1 to 5 as shown in FIG. 13.

In an embodiment of the present invention, a power state of application may be determined according to a power state of the electronic device and a power-rating of an application.

For example, in a state where a power-rating of application is a 5 rating, when a power state of electronic device is level 1 (excellent), the power state of application may also be set to level 1 (enough).

Meanwhile, when a power state of an electronic device is lowered to be insufficient from level 1 to level 3, the power state of the application may be altered from state 1 (enough) to state 3 (limit). In that case, restrictions may be imposed on the execution of an application, functions of the electronic device, etc.

Figure 14:
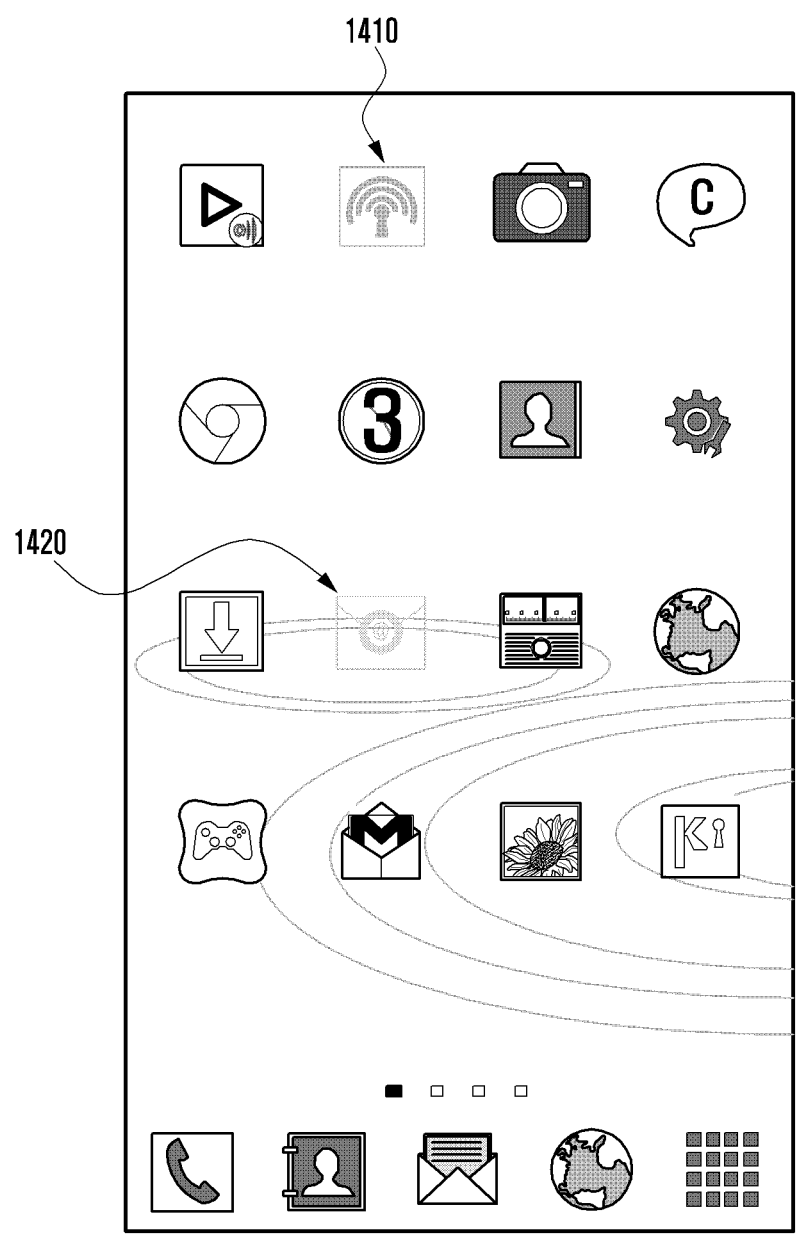
FIG. 14 is a screen where transparency of icons is controlled according to the power states of the respective corresponding applications.

FIG. 14 is a screen where transparency of icons is controlled according to the power states of the respective corresponding applications.

It is assumed that a power state of an application corresponding to an icon 1410 of the icons shown in FIG. 14 is in State 2 described in table 1. It is also assumed that a power state of an application corresponding to an icon 1420 is in State 3 described in table 1.

In that case, since the power state of an application corresponding to an icon 1410 is better than that of an application corresponding to an icon 1420, the transparency of the icon 1410 is set to be smaller than that of the icon 1420. That is, the transparency of an icon corresponding to an application may be set to be displayed in such a way that the lower a power state of the application the more transparent the corresponding icon.

It should be understood that the embodiment is an example of the present invention and the present invention is not limited thereto.

As described above, since the present invention can control the displaying of an electronic device based on a power state of the electronic device and a power-rating of an application, thereby informing users of the current remaining power of the electronic device. The present invention can allow user to intuitively recognize an application that is capable of consuming a relatively large amount of power in the electronic device and may exhaust, if it is executed, the battery quickly.

Although exemplary embodiments of the invention have been described in detail above, it should be understood that many variations and modifications of the basic inventive concept herein described, which may be apparent to those skilled in the art, will still fall within the spirit and scope of the exemplary embodiments of the invention as defined in the appended claims.

What is claimed is:

1. A method of an electronic device, the method comprising:
   identifying device power state information for the electronic device including a plurality of hardware modules;
   identifying whether a first application is executed together with a second application;
   identifying, in case that the first application is executed together with the second application, whether the first application uses a same hardware module as the second application, the hardware module being included in the plurality of hardware modules;
   determining, in case that the first application uses the same hardware module as the second application, application power rating information for the first application as a first application power rating;
   determining, in case that the first application does not use the same hardware module as the second application, the application power rating information for the first application as a second application power rating, the first application power rating being associated with a power consumption for the first application lower than the second application power rating;
   determining application power state information for the first application based on the device power state information and the application power rating information; and
   controlling a display of the electronic device or display of an icon corresponding to the first application based on the application power state information.

2. The method of claim 1, wherein the determining of the application power state information comprises:
   determining the application power state information based on multiple relation power-rating information created based on whether at least one application is executed.

3. The method of claim 2, wherein the determining of the application power state information further comprises:
   installing an application;
   setting the multiple relation power-rating information to the installed application; and
   updating the multiple relation power-rating information when a preset period or a preset condition is satisfied.

4. The method of claim 3, wherein the updating of the multiple relation power-rating information comprises:
   predicting a changed application power state information while the first application is executed simultaneously along with other applications and an operating state of the electronic device.

5. The method of claim 1, wherein the application power state information varies according to the device power state information and a power-rating of at least one application.

6. The method of claim 1, wherein the controlling of the display comprises:
   controlling a brightness of the display of the electronic device based on the application power state information.

7. The method of claim 1, wherein the controlling of the display further comprises:
   controlling the display of the icon in at least one of a color, a transparency, or a border.

8. The method of claim 1, further comprising:
   restricting execution of functions of the electronic device based on the application power state information.

9. The method of claim 1, wherein a power consumption indicated by the first application power rating is lower than a sum of a respective power consumption rating indicated by each of application power ratings for the first application and the second application, which is determined in case that the first application and the second application using the same hardware module are executed separately.

10. The method of claim 1, wherein a power consumption indicated by the second application power rating is same as a sum of a respective power consumption rating indicated by each of application power ratings for the first application and the second application, which is determined in case that the first application and the second application using the same hardware module are executed separately.

11. An electronic device comprising:
a display; and
a processor configured to:
identify device power state information for the electronic device including a plurality of hardware modules,
identify whether a first application is executed together with a second application,
identify, in case that the first application is executed together with the second application, whether the first application uses a same hardware module as the second application, the hardware module being included in the plurality of hardware modules,
determine, in case that the first application uses the same hardware module as the second application, application power rating information for the first application as a first application power rating,
determine, in case that the first application does not use the same hardware module as the second application, the application power rating information for the first application as a second application power rating, the first application power rating being associated with a power consumption for the first application lower than the second application power rating,
determine application power state information for the first application based on the device power state information and the application power rating information, and
control a display of the electronic device or display of an icon corresponding to the first application according to the application power state information.

12. The electronic device of claim 11, wherein the processor is further configured to determine the application power state information based on multiple relation power-rating information created based on whether at least one application is executed.

13. The electronic device of claim 12, wherein the processor is further configured to:
install an application,
set the multiple relation power-rating information to the installed application, and
update the multiple relation power-rating information when a preset period or a preset condition is satisfied.

14. The electronic device of claim 13, wherein the processor is further configured to predict a changed application power state information as the at least one application is executed simultaneously along with other applications and an operating state of the electronic device.

15. The electronic device of claim 11, wherein the application power state information varies according to the device power state information and a power-rating of at least one application.

16. The electronic device of claim 11, wherein the processor is further configured to control a brightness of the display based on the application power state information.

17. The electronic device of claim 11, wherein the processor is further configured to control the display of the icon in at least one of a color, a transparency, or a border.

18. The electronic device of claim 11, wherein the processor is further configured to restrict execution of functions of the electronic device based on the application power state information.

19. The electronic device of claim 11, wherein a power consumption indicated by the first application power rating is lower than a sum of a respective power consumption rating indicated by each of application power ratings for the first application and the second application, which is determined in case that the first application and the second application using the same hardware module are executed separately.

20. The electronic device of claim 11, wherein a power consumption indicated by the second application power rating is same as a sum of a respective power consumption rating indicated by each of application power ratings for the first application and the second application, which is determined in case that the first application and the second application using the same hardware module are executed separately.

* * * * *